United States Patent
Kramer et al.

[15] 3,687,303
[45] Aug. 29, 1972

[54] APPARATUS FOR REMOVAL OF A CERTAIN NUMBER OF PLATES FROM A STACK OF PLATES

[72] Inventors: Willi Kramer, Schlesienring 20, 6368 Bad Vilbel; Willi Muskulus, An der Pfaffenmauer 17, 6 Bergen Enkheim, Germany

[22] Filed: April 12, 1971

[21] Appl. No.: 132,998

[30] Foreign Application Priority Data

April 24, 1970 Germany..........P 20 19 924.0

[52] U.S. Cl..............................................214/8.5 SS
[51] Int. Cl..............................................B65g 59/06
[58] Field of Search.............214/8.5 R, 8.5 SS, 8.5 K

[56] References Cited

UNITED STATES PATENTS

| | | | |
|---|---|---|---|
| 2,701,736 | 2/1955 | Heppenstall | 214/8.5 R X |
| 2,875,909 | 3/1959 | Babick | 214/8.5 R X |

*Primary Examiner*—Gerald M. Forlenza
*Assistant Examiner*—George F. Abraham
*Attorney*—Larson, Taylor & Hinds

[57] ABSTRACT

A device for removing a desired number of plates from a stack of plates such as a stack of punched plates for making stators for electric motors. The stack is held in compression and a knife member is brought into contact with the side of a certain plate in the stack thus locating a desired number of plates between the knife and one end of the stack. Clamping means are provided adjacent the knife member to engage the stack such that when the compressive force holding the entire stack is removed, the portion of the stack between the clamping means and the one stack end is held in compression by the clamping means. In this manner, the desired number of plates are held stationary relative to the knife member and thus do not move relative to the knife member when the compressive force is removed. After separation of the other portion of the stack, the knife member and clamping means are disengaged from the portion of the stack containing the desired number of plates and a stack containing the desired number of plates is removed from the device.

9 Claims, 5 Drawing Figures

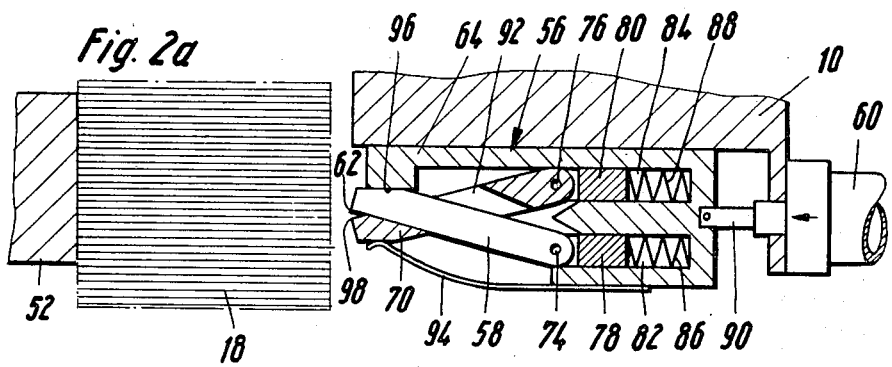
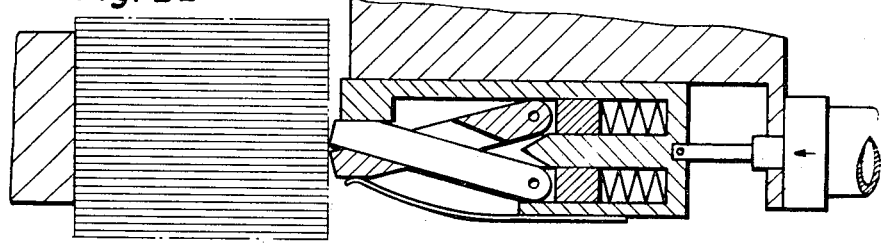
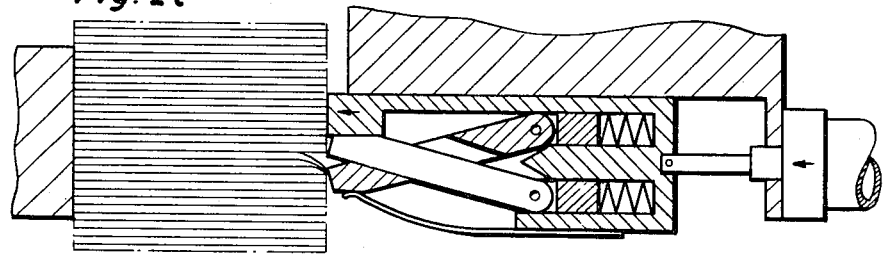
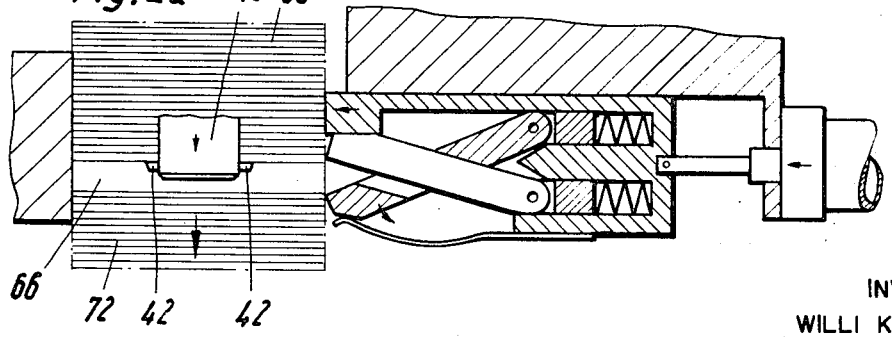

APPARATUS FOR REMOVAL OF A CERTAIN NUMBER OF PLATES FROM A STACK OF PLATES

BACKGROUND OF THE INVENTION

This invention relates to a device for the removal of a certain number of sheets for example punched plates for stators of electric motors, from a stack of plates compressed under tension by division of said stack at a certain place by means of a knife member moveable from a position adjacent the side of the stack to a position in engagement with the side of the stack.

The technical problem in the case of such devices consists in grasping precisely the same number of plates in each removing process. For this purpose it is necessary to compress the plates stacked on top of one another under a relatively high pressure so that they will rest with certainty closely one on top of the other without any space between them. However, the strong compression of the stack of plates produces a certain elastic deformation of the plate material. When the compressive force is removed, the stack of plates expands to a thickness corresponding to the unloaded state and this urges the plates to move relative to the knife member. However, the knife placed at the place of division of the stack is not capable of resisting the power of the elastic reshaping of the material. Expansion of the previously compressed sheet pack that is to be removed will therefore force one or more plates past the knife while it is positioned in engagement with the side of the stack, and when the remainder of the stack is pulled away from the place of division these one or more plates are not grasped along with the others during the mechanical removal of the desired stack. The result of the operation is therefore uneven.

It is an object of the present invention to provide a device of the initially mentioned type which overcomes the disadvantages mentioned above.

BRIEF SUMMARY OF THE INVENTION

The foregoing and other objects which will be apparent to those having ordinary skill in the art are obtained by providing an apparatus for removal of a desired number of sheets from a stack of sheets comprising a first sheet holding member, a second sheet holding member spaced from said first plate holding member to accomodate a stack of said sheets between said holding members, means for urging said holding members together to compress a stack of sheets positioned between said holding members, a knife member located adjacent the side of said stack of sheets intermediate said holding members, said knife member being moveable between a first position spaced from the side of said stack of sheets and a second position in contact with the side of a certain sheet in said stack of sheets, means to move one of said holding members away from the other holding member, clamping means for engaging the side of said stack of sheets, said clamping means being located adjacent said knife member, and means for engaging said clamping means with the side of said stack of sheets whereby, upon movement of one of said holding members away from the other holding member, the portion of said stack of sheets between said clamping means and said other holding member is held there between under compression, and means for removing said portion of said stack of sheets from said apparatus to provide a desired number of sheets from said stack of sheets.

The clamping means preferably includes jaws positioned adjacent the knife on the sides of the portion of the sheet pack that is to be removed, between which jaws the sheets can be clamped in their position assumed during compression of the stack so that they will maintain this position in the case of the release of the compressive force.

Through this invention, no more than the predetermined number of sheets will be removed from the stack. Thus, the correct number of plates will not be exceeded. This could happen in the event that one or more of the plates is caught by the last plate grasped by the knife. This might happen, for example because the ridges of cuts made by the knife interlock under the gripping pressure. In another case, the plates might adhere to each other because of a poorly removed film of oil. Provisions have been made in a preferred embodiment of the invention for a second knife disposed with the intermediate distancing of one thickness of the plate measured at the edge of the knives, which second knife repels a sheet adhering to the last plate grasped by the first knife.

In another embodiment of the invention, the two knives are pivotally mounted on axes extending transversely to the longitudinal axis of the stack of plates and are guided in opposite slanting positions crossed in the manner of scissors, whereby the pivot axes are positioned in a clamping jaw which is radially movable in relation to the longitudinal axis of the stack of plates.

DETAILED DESCRIPTION OF THE INVENTION

Figure 1:
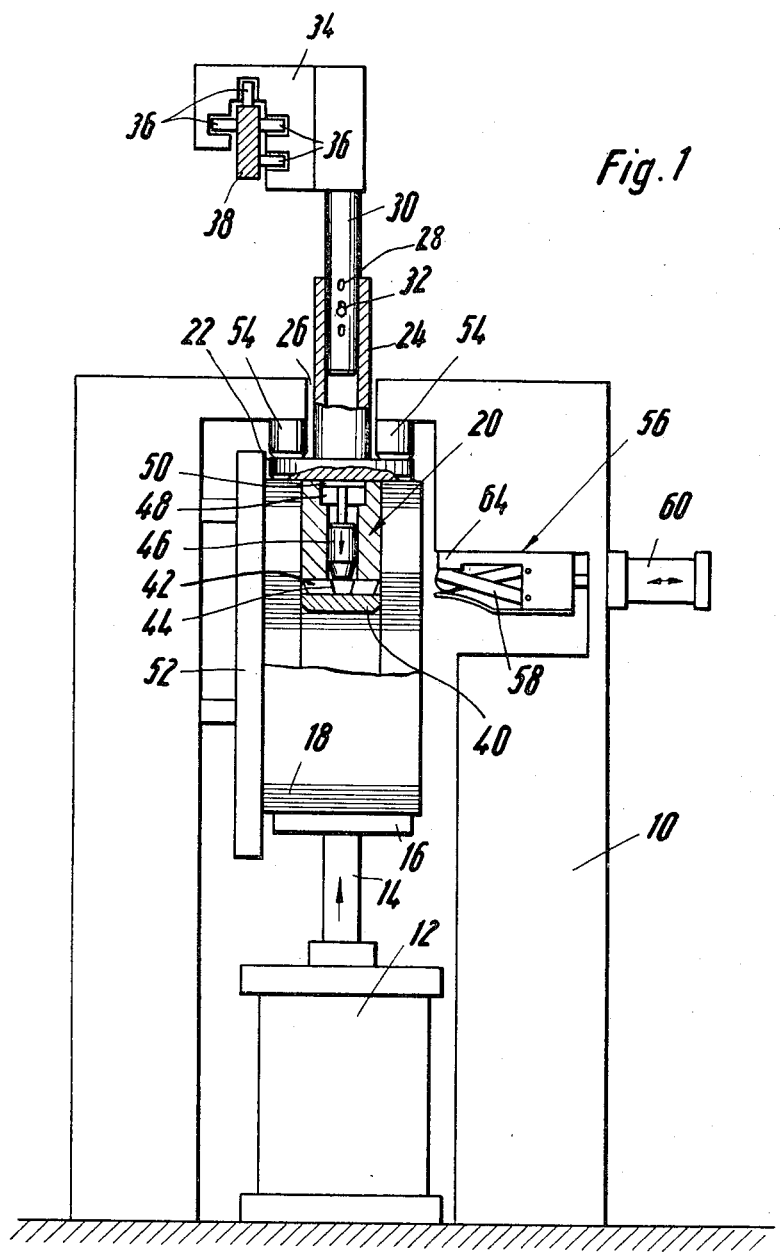

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 1 is a diagrammatic side elevation view, partially in section, of a device for the removal of a certain number of punched stator plates from the upper end of a perpendicular stack of plates;

FIGS. 2 (a), (b), (c), and (d) are diagrammatic views of a portion of the device of FIG. 1 showing a clamping means and knife members in different positions.

The device shown in FIG. 1 has a portal-like frame 10 in the open middle of which a power cylinder 12 is disposed. The latter can be operated, for example, hydraulically. The piston rod 14 of power cylinder 12 bears at its upper end a holding plate or platen member 16 on which a stack of plates 18, in this example punched plates for stators of electric motors, has been placed. A certain number of plates is to be lifted off from supply stack 18 and is to be moved away for other processing, for example, welding or screwing together, in one operating step. The operation is repeated successively and stack 18 is replenished as needed.

The transportation of the sheet pack taken off at the upper end of stack 18 is accomplished by means of an expanding mandril designated generally as 20, which in its narrowest condition, fits into the center bore of the stator sheets and holds these whenever it is expanded. The expanding mandril 20 is seated firmly at an upper holding plate or platen member 22, which in turn is connected with a bushing 24 which extends in the transverse head of the frame 10 toward the outside through an elongated slit 26 extending perpendicularly to the plane of the drawing. A series of elongated holes 28 are disposed in the bushing 24. A bar 30 inserted into said bushing 24 is attached with a certain axial play by means of across blot 32 extending through one of said holes 28 according to the choice in several axial positions. Bar 30 at its upper end is attached to a transfer car 34 which can be moved on rollers 36 along a rail 38 in the direction of slit 26, that is perpendicular to the plane of the drawing.

The expanding mandril 20, which, depending on the shape of the stacked plates, can be replaced by some other carrying elements, comprises a piston 40 (see FIG. 2 (d)) with several encircling segments 42 which can be expanded elastically and radially. The expansion may be accomplished by means of an inside piston 46 which is conical at its front end and presses against conical inside surfaces 44 of the peripheral segments 42, which inside piston is moved by a double acting piston 50 — cylinder 48. Cylinder 48 can be acted upon hydraulically or pneumatically.

The sheets of stack 18 will be guided for motion in an axial direction along a guide member 52. Whenever power cylinder 12 moves the lower platen 16 and the entire stack of plates upward, the uppermost plate will abut platen 22 which is supported by way of exchangeable stop elements 54 by frame 10. The level of the upper edge of the compressed stack 18 of the plates can be adjusted by the size of the stop elements 54 and a corresponding selection of an elongated hole 28 in bar 30 for bolt 32.

On the side of the sheet pack opposite the guide member 52 there is a member moveably attached to the frame 10 generally designated by 56 and which contains a knife 58 which can be forced with its front edge 62 laterally against the side of the sheet stack under the action of a hydraulic or pneumatic power cylinder 60.

In the compressed state of the stack of plates 18, whenever the plates lie tightly one on top of the other without any intervening spaces, there will be a number of sheets depending on the constant thickness of the sheets between platen 22 positioned by the stop elements 54, and the edge 62 of the knife. This number is the desired number of sheets to be lifted from the stack. If now, as had been known hitherto, one forces the edge of the knife 62 against the side of the stack 18 in the compressed state and if one afterwards lowers the lower platen 16, then the edge 62 of the knife is supposed to hold the sheets located between said edge and the upper platen 22 while the sheets with the holding platen 16 located below the edge of the knife 62 are moved downwards. However, the knife 58 is not capable of absorbing the forces of elasticity of the compressed sheet material without additional measures. If one would attempt to resist these forces nevertheless, it would be necessary to press the knife under very high pressure against the sheets, as a result of which the latter would be damaged. The attachment of several knives distributed over the periphery of the stack of sheets would first of all be very costly and in practice it would not lead to the desired results either because one would have to count with the fact that in many instances all sheet elements are somewhat thicker on one side than they are on the opposite side. These defects add up over the height of the stack whenever the sheet elements are not turned between punching and stacking. Several knives disposed in themselves on the same level may therefore grasp each time a different number of sheets.

In the case of the present device, the previously mentioned disadvantage will be avoided by the fact that together with the knife 58, a clamping jaw member 64 is also pressed against the stack 18 of plates. This jaw clamps the sheets just above the edge of knife 62 between itself and the guide 52 or of some other opposite clamping jaw, so that whenever the stack 18 of sheets is afterwards relieved of pressure, the sheets above knife 62 will maintain without change their position assumed in the compressed state and the expansion of the entire sheet pack located above the edge 62 of the knife will not press against the knife edge.

The pressure of the clamping jaw 64 and of the knife 58 need be maintained only for a certain length of time until a sufficiently broad gap 66 (FIG. 2(d)) has developed between the firmly held upper sheet pack and the lower remnant of the stack 18 of sheets so that the peripheral segments 42 of the expanding mandril 20 can be spread out to grasp the upper sheets of the original stack of sheets. In the compressed state of the sheets, the peripheral segments 42 will reach below the plane of the edge 62 of the knife to such an extent that, after separation of the upper sheet pack from the rest of the stack, the spreading apart of the peripheral segments 42, and the withdrawal of the clamping jaw 64 and of the knife 58, the sheets now carried by the expanding mandril 20 can now relax and expand without pushing the lowest sheet from the peripheral segments 42. The removed sheet pack designated in FIG. 2(d) as 68, hanging from the expanding mandril 20, is moved laterally along the rail 38 for further processing.

In addition to the first mentioned knife 58, in the case of the device shown a second knife 70 is provided which has the task to import a push to the sheet adhering below the sheet grasped by the edge 62 of the knife so that it will be lowered with the rest of the stack 18 of the plates designated in FIG. 2(d) as 72 and so that it will not be conveyed together with the sheets grasped by the expanding mandril 20 for further processing. The pushing off of the first sheet below that grasped by the edge of the knife 62 by way of the knife 70 can best be seen from FIG. 2(c), where, however, the deformation of the sheet has been shown in an exaggerated way. The force exerted by the knife 70 on the sheet only in order to push away the sheet, naturally does not need to be so great that the sheet will be deformed permanantly.

Both knives 58 and 70 are held and guided diagonally with opposite slant corresponding to their direction of thrust. Each of the knives is pivotally mounted on an axle 74, 76 which are each respectively attached in slidable bearing blocks 78, 80. Both bearing blocks 78 and 80 are each respectively guided in a milled out portions 82, 84 of the clamping jaw 64 and each is respectively forced toward the stack of plates by a spring 86, 88, inserted into the respective milled out portion. Therefore, both the clamping jaw 64 as well as both knives 58 and 70 are moved toward the stack 18 of sheets by the power cylinder 60 via the piston rod 90. In order that the bearing blocks 78 and 80 do not slip out from their milled out parts 82 and 84, lateral stops (not shown) are provided. Also, guides for motion of clamping jaw 64 on frame 10 have been omitted for the sake of simplifying the drawing.

As shown in FIGS. 2(a) to (d), the knives 58 and 70 are disposed crossing in the manner of scissors, whereby the knife 58 passes through the knife 70 which includes a channel 92. The front ends of the knife are pressed by a leaf spring 94 one against the other and together against a lower stop surface 96 of the clamping jaw 64. In the retracted starting position shown in FIG. 2(a), the intermediate distance of the edge 62 of the knife 58 from the thrusting edge 98 of the knife 70 amounts to one thickness of a sheet. Whenever the knives as shown in FIGS. 2(b) to (d) thrust against the sheets, a torque directed oppositely in relation to the pertinent swiveling axle 74, 76 is exerted on each knife, which torque causes the edges 62 and 98 of the knives to separate from one another under tension of the spring 94 upon the widening of the gap 66 between the sheets.

In addition, FIG. 2(d) shows clearly that, quite apart from the advantageous effect of the clamping jaw 64, the resilient, swivelable mounting of the knife 58 as provided does have the advantage that while the knife can be pressed against the stack of sheets relatively lightly, the contact pressure and thus the power of resistance which the knife opposes to an expansion of the sheet pack 68 would rise considerably whenever the lowest sheets of the pack 68 grasped by the edge 62 of the knife would attempt to press the knife 58 through its horizontal dead center position.

What is claimed is:

1. Apparatus for removal of a desired number of sheets from a stack of sheets comprising:
   a first sheet holding member;
   a second sheet holding member spaced from said first sheet holding member to accomodate a stack of said sheets between said holding members;
   means for urging said holding members together to compress a stack of sheets positioned between said holding members;
   a knife member located adjacent the side of said stack of sheets intermediate said holding members, said knife member being moveable between a first position spaced from the side of said stack of sheets and a second position in contact with the side of a certain sheet in said stack of sheets;
   means to move one of said holding members away from the other holding member;
   clamping means for engaging the side of said stack of sheets said clamping means being located adjacent said knife member; and
   means for engaging said clamping means with the side of said stack of sheets whereby, upon movement of one of said holding members away from the other holding member, the portion of said stack of sheets between said clamping means and said other holding member is held therebetween under compression; and
   means for removing said portion of said stack of sheets from said apparatus to provide a desired number of sheets from said stack of sheets.

2. Apparatus according to claim 1 further including a further knife member adjacent said side of said stack of sheets, said further knife member being moveable between a first position spaced from the side of said stack of sheets and a second position in engagement with a side of a further sheet in said stack of sheets, said further sheet being adjacent said certain sheet and located on the side thereof towards said one holding member; said apparatus further including means for urging said further knife member in a direction to separate said further sheet from said certain sheet.

3. Apparatus according to claim 1 wherein said knife member is pivotally mounted about an axis directed transversely to the longitudinal axis of said stack of sheets, said knife member slanting in a direction towards said other holding member.

4. Apparatus according to claim 3 wherein said knife member is held in said slanting direction by stop means and a spring member urging said knife member against said stop.

5. Apparatus according to claim 1 including means to urge said knife member against the side of said certain sheet.

6. Apparatus according to claim 2 wherein said further knife member is pivotally mounted about an axis directed transversely to the longitudinal axis of said stack of sheets, said further knife member slanting in a direction towards said one holding member.

7. Apparatus according to claim 6 wherein one of said knife members includes a channel through which the other of said knife members passes, said apparatus further including means urging one of said knife members against the other knife member and further urging said other knife member against a stop whereby the sheet-engaging edges of said knife members are positioned adjacent said stack of sheets and spaced apart about one sheet thickness in a direction longitudinally of the stack of sheets.

8. Apparatus according to claim 1 wherein said knife member is mounted on said clamping means.

9. Apparatus according to claim 7 wherein both of said knife members are mounted on said clamping means.

* * * * *

UNITED STATES PATENT OFFICE
CERTIFICATE OF CORRECTION

Patent No. 3,687,303　　　　　　　　Dated August 29, 1972

Inventor(s) Willi KRAMER and Willi MUSKULUS

It is certified that error appears in the above-identified patent and that said Letters Patent are hereby corrected as shown below:

The heading should be amended to include the assignee as follows:

--Assigned to:　Balzer & Droll KG, Niederdorfelden, Germany.

Signed and sealed this 1st day of May 1973.

(SEAL)
Attest:

EDWARD M. FLETCHER, JR.　　　　　ROBERT GOTTSCHALK
Attesting Officer　　　　　　　　　Commissioner of Patents